(12) United States Patent
Acker

(10) Patent No.: US 8,327,873 B2
(45) Date of Patent: Dec. 11, 2012

(54) TEMPERATURE BACK FLOW CONTROL VALVE

(75) Inventor: Larry K. Acker, Costa Mesa, CA (US)

(73) Assignee: ACT, Inc., Costa Mesa, CA (US)

(*) Notice: Subject to any disclaimer, the term of this patent is extended or adjusted under 35 U.S.C. 154(b) by 985 days.

(21) Appl. No.: 12/046,696

(22) Filed: Mar. 12, 2008

(65) Prior Publication Data
US 2009/0229684 A1 Sep. 17, 2009

(51) Int. Cl.
F16K 49/00 (2006.01)
F16L 53/00 (2006.01)

(52) U.S. Cl. ............ 137/337; 417/32; 417/53; 236/12.1

(58) Field of Classification Search .................... 417/26, 417/32, 53, 199.2; 137/337; 236/12.1
See application file for complete search history.

(56) References Cited

U.S. PATENT DOCUMENTS

| | | | | |
|---|---|---|---|---|
| 2,842,155 A | * | 7/1958 | Peters | 137/337 |
| 4,201,518 A | * | 5/1980 | Stevenson | 417/12 |
| 4,331,292 A | * | 5/1982 | Zimmer | 237/19 |
| 4,682,728 A | * | 7/1987 | Oudenhoven et al. | 236/12.12 |
| 4,917,294 A | * | 4/1990 | Bergmann et al. | 236/93 B |
| 5,009,572 A | * | 4/1991 | Imhoff et al. | 417/32 |
| 5,205,318 A | * | 4/1993 | Massaro et al. | 137/337 |
| 5,277,219 A | * | 1/1994 | Lund | 137/337 |
| 5,620,309 A | * | 4/1997 | Todden et al. | 417/199.2 |
| 6,536,464 B1 | * | 3/2003 | Lum et al. | 137/337 |
| 7,073,528 B2 | * | 7/2006 | Kempf et al. | 137/337 |
| 7,740,182 B2 | * | 6/2010 | Lum et al. | 236/12.13 |
| 7,779,857 B2 | * | 8/2010 | Acker | 137/337 |
| 2002/0062867 A1 | * | 5/2002 | Kempf et al. | 137/334 |
| 2009/0007972 A1 | * | 1/2009 | Lum et al. | 137/468 |

* cited by examiner

Primary Examiner — Charles Freay
Assistant Examiner — Nathan Zollinger
(74) Attorney, Agent, or Firm — Walter A. Hackler

(57) ABSTRACT

Temperature control valve apparatus for preventing back flow from a cold water line into a hot water line includes a housing having an inlet or connection to a hot water line, an outlet for a connection to a cold water line and an interconnecting bore with a valve seat. A removable valve plug is disposed in the bore proximate the valve seat and a valve spring biases the valve plug in a spaced apart relationship with the valve seat for enabling water to flow therepast and through the housing from the hot water line to the cold water line. A thermal actuator disposed in an operative position for moving the valve plug to a seating position against the valve plug is provided to prevent water flow therepast from the cold water line to the hot water line.

10 Claims, 1 Drawing Sheet

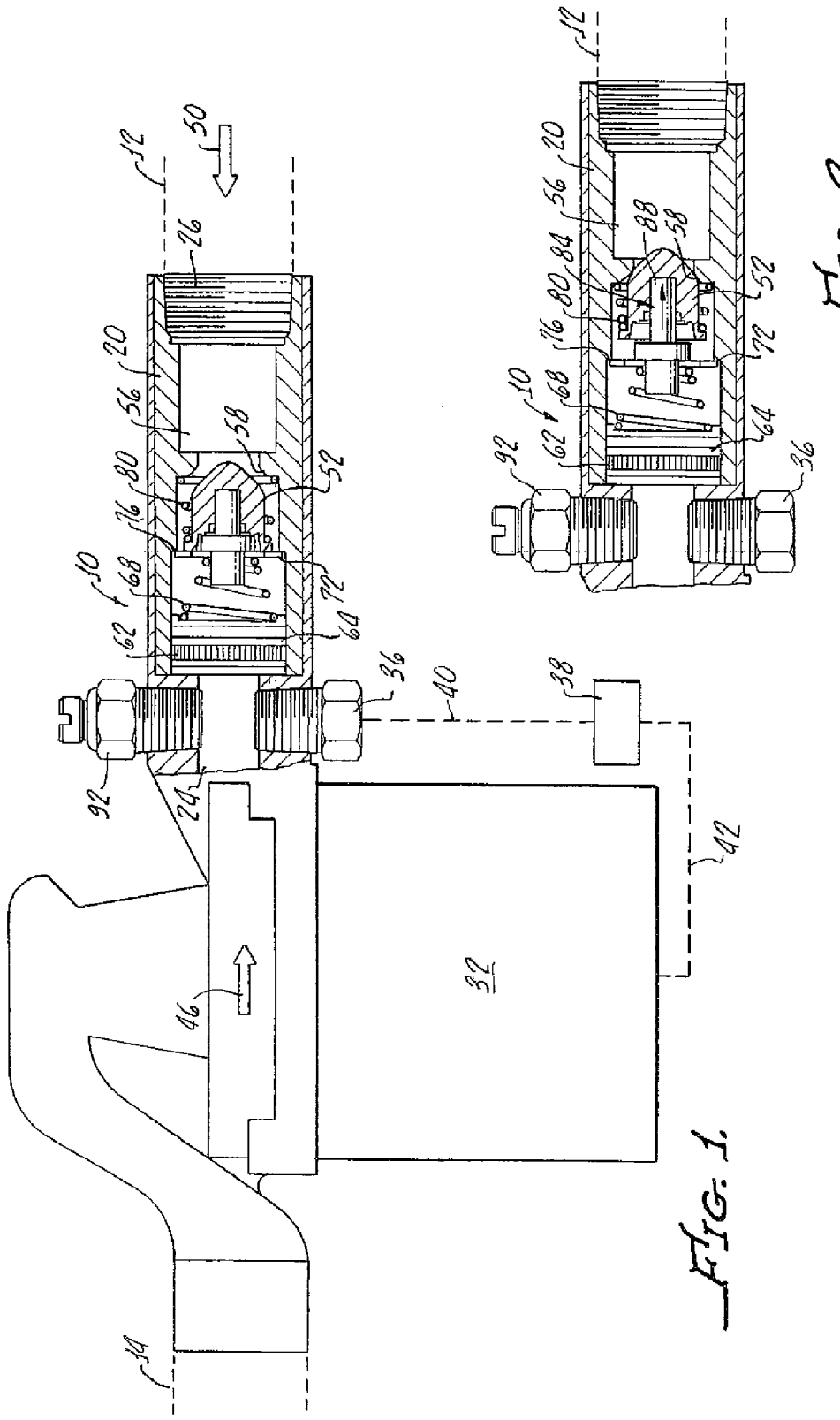

TEMPERATURE BACK FLOW CONTROL VALVE

The present invention relates to a back flow control valve for use with residential or commercial water distribution systems for supplying water to various fixtures at different temperatures.

Residential and commercial water distribution systems provide water to various fixtures which includes sinks, washing appliances, showers, and the like that are disposed throughout the residence or commercial establishment.

Such distribution systems draw water from an external source, which is typically at a cold temperature. The cold water is directly provided to the fixture while other portions of the distribution system deliver water to the fixture through a water heater and cold and hot water at the fixture is independently controlled by the user or an appliance.

In order to provide a ready source of hot water at the fixture, the distribution system may include recirculation hot water lines to continually circulate hot water pass the fixture or a "cross-connection" (hot to cold water flow) may be utilized with a pump disposed at a fixture or the water heater. Such systems are set forth in U.S. Pat. Nos. 5,277,219, 5,385,168, 5,829,475, and 6,962,162 assigned to ACT, Inc. These patents are to be incorporated herewith in their entirety for providing examples of systems for which the present invention finds use.

A problem which can arise with such systems is the possibility of a pressure differential occurring between the hot water line and the cold water line thus causing bleeding of cold water from the cold water line into the hot water line through the cross connection.

The present invention overcomes this problem and provides for temperature control valve apparatus for preventing back flow from a cold water line to a hot water line which may be located at any part of the hot or cold water line or dedicated loop return line.

SUMMARY OF THE INVENTION

Temperature control valve apparatus in accordance with the present invention for preventing back flow from a cold water line through a hot water line generally includes a housing having an inlet for connection to a hot water line, an outlet for connection to a cold water line and an inner connecting bore.

The bore includes a valve seat and a removable valve plug is disposed in the bore proximate the valve seat. A valve spring is provided which biases the valve plug in a spaced apart relationship with the valve seat for enabling water to flow therepast and through the housing from the hot water line to the cold water line.

A thermal actuator is disposed in an operative position for moving the valve plug to a sealing position against the valve seat to prevent water flow therepast from cold line to the hot water line with the actuator being operative at a preselected water temperature. More particularly, the thermal actuator is disposed within the valve plug and a separate temperature sensor is disposed in the housing for sensing the water temperature in the hot water line.

The temperature sensor is interconnected with a control system and provides an output signal for control of a pump connected to the housing inlet for passing water through the housing from the inlet to the outlet past the valve plug. The pump is responsive, through the controller, to a temperature sensor output signal for stopping at a predetermined water temperature. The preselected water temperature for operating an actuator is greater than the predetermined temperature for stopping the pump. Accordingly, the actuator does not operate when the pump is transferring water from the hot water line to the cold water line. A bleed valve may be disposed in the inlet of the housing for enabling priming of the pump and a support spring may be provided for positioning the valve plug within the housing bore.

A method in accordance with the present invention for preventing back flow from the cold water line into a hot water line generally includes providing a housing having an inlet for connection to a hot water line, an outlet for connection to a cold water line and an inner connecting bore which includes a valve seat.

The provided apparatus further includes a moveable valve plug disposed within the bore proximate the valve seat and a valve spring biasing the valve plug in a spaced apart relationship with the valve seat for enabling water to flow therepast and through the housing from the hot water line to the cold water line. The provided apparatus further includes a thermal actuator disposed in operative position for moving the valve plug to a sealing position against the valve seat to prevent water to flow therepast from the cold water line to the hot water line with the actuator being operative at a preselected water temperature.

The method further includes connecting the apparatus between the hot water line and the cold water line.

BRIEF DESCRIPTION OF THE DRAWINGS

The advantages and features of the present invention will be better understood by the following description when considered in conjunction with the accompanying drawings, in which:

FIG. 1 is a cross sectional side view of the apparatus in accordance with the present invention showing an open valve plug; and FIG. 2 is a view similar to FIG. 1 showing a closed valve plug.

DETAILED DESCRIPTION

With reference to FIG. 1, there is shown temperature control valve apparatus 10 in accordance with the present invention for preventing back flow from a cold water line 12 into a hot water line 14.

The apparatus 10 generally includes a housing 20 having an inlet 24 for connection to the hot water line 14 and an outlet 26 for connection to the cold water line 12. The apparatus 10 may include a pump 32 disposed between the inlet 24 and the hot water line 14 for pumping water through the housing from the hot water line 14 to the cold water line 12, as hereinafter discussed.

It should be appreciated that the pump 32 may be designed for any controlled recirculation or for "cross connection" or at a hot water heater (not shown), connected to a dedicated hot water return (not shown), referred to as a standard recirculation hot water distribution system. All of these systems are well known in the art and specific examples set forth into the hereinabove referenced patents. Depending upon the size of the apparatus 10, namely the housing 20 and pump 32, the apparatus 10 may be suitable for any residential or commercial application where, as hereinabove noted, a pressure drop may occur between the cold water line 12 and the hot water line 14 causing a back flow of water therebetween.

A temperature sensor 36 disposed in the housing inlet 24 senses water temperature from the hot water line 14 and through a controller 38 operates the pump 32 as indicated by a dashed lines 40, 42.

In operation once the pump 32 is started manually, or automatically via a temperature or change in temperature controller (not shown), hot water is pumped from the hot water line 14 to the cold water line 12 until a temperature sensor 36 output signal is sent at a predetermined water temperature to stop the pump. At this point, sufficient hot water has been transported from the hot water line 14 to the cold water line 12 in order to satisfy the immediate demands of hot water at a residential or commercial fixture (not shown). This flow is indicated by the arrow 46.

As hereinabove mentioned, a problem can arise if a differential pressure occurs between the cold water line 12 and hot water line 14 at which time back flow of water indicated by the arrow 50 may occur. Such flow is terminated by the present invention through the use of a moveable valve plug 52 disposed in a housing bore 56 proximate a valve seat 58.

The valve plug 52 is supported within the bore 56 by a lock ring 62, o-ring 64, and a support spring 68 bearing against a vented set washer 72 bearing against a step 76 in the housing bore 56.

A valve spring 80 is provided for biasing the valve plug 52 in a spaced apart relationship with the valve seat 58 for enabling water to flow therepast and through the housing 20 from the hot water line 14 to the cold water line 12.

As shown in FIG. 1, the valve plug 52 includes a thermal actuator 84 disposed therein an in an operative position for moving the valve plug 52 to a sealing position against the valve seat 58 as shown in FIG. 2 to prevent water flow therepast from the cold water line 12 to the hot water line 14. The actuator is operative at a preselected water temperature, such as, for example, 95° degrees.

It is, of course, important that the preselected water temperature for operating the actuator 84 is greater than the predetermined temperature for stopping the pump 32. At the preselected water temperature, the actuator moves the valve plug into the seated position. Upon a water temperature, less than the preselected water temperature, the valve spring 80 moves the valve plug again to a spaced apart relationship with the valve seat 58.

An actuator suitable for use in the present invention may be obtained from Vernet A.S. Magnum Corporation of France or from Caltherm Corporation of Columbia, Ind. These companies provide complete specification for actuators utilizing a solid expansion material, such as wax or a liquid state expansion material for operating an actuator piston 88.

A conventional bleeder valve 92 may be provided and disposed in the housing inlet 24 in order to prime the pump 32 upon installation of the apparatus 10.

A method in accordance with the present invention includes providing the hereinabove described apparatus 10 and connecting the apparatus 10 between the hot water line 14 and cold water line 12.

Although there has been hereinabove described a specific temperature back flow control valve in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A temperature control valve apparatus for a recirculation pump the control valve apparatus being configured for preventing back flow from a cold water line into a hot water line during selected periods of non-operation of the pump, the control valve apparatus comprising:

a housing having an inlet for connection to the hot water line, an outlet for connection to the cold water line, and an interconnecting bore, the bore including a valve seat;

a moveable valve plug disposed in the bore proximate said valve seat;

a valve spring, biasing the valve plug in a spaced apart relationship with said valve seat, for enabling water to flow therepast and through said housing from the hot water line to the cold water line;

a thermal actuator disposed in an operative position for moving said valve plug to a sealing position against said valve seat to prevent water flow therepast from the cold water line to the hot water line only during non-operation of the pump, the actuator being operative at a preselected water temperature; and a temperature sensor disposed in said housing for sensing water temperature in the hot water line, wherein the preselected water temperature for operating the actuator is greater than a predetermined temperature for stopping said pump.

2. The apparatus according to claim 1 wherein said thermal actuator is disposed inside said valve plug.

3. The apparatus according to claim 2 wherein said temperature sensor is disposed in the housing inlet.

4. The apparatus according to claim 3 further comprising a bleed valve disposed in the housing inlet for enabling priming of said pump.

5. The apparatus according to claim 4 further comprising a support spring for the positioning said valve plug within said bore.

6. A method for preventing back flow from a cold water line into a hot water line during selected periods of non-operation of a recirculation pump, said method comprising:

providing an apparatus including a housing having an inlet for connection to the hot water line, an outlet for connection to the cold water line, and an interconnecting bore, the bore including a valve seat, said apparatus comprising:

a moveable valve plug disposed in the bore proximate said valve seat;

a valve spring biasing the valve plug in a spaced apart relationship with said valve seat for enabling water to flow therepast and through said housing from the hot water line to the cold water line;

a thermal actuator disposed in an operative position for moving said valve plug to a sealing position against said valve seat to prevent water flow therepast from the cold water line to the hot water line during non-operation of the pump, the actuator being operative at a preselected water temperature; and a temperature sensor disposed in said housing for sensing water temperature in the hot water line; and connecting the apparatus between the hot water line and the cold water line, wherein the preselected water temperature for operating the actuator is greater than a predetermined temperature for stopping said pump.

7. The method according to claim 6 wherein providing an apparatus further comprises disposing the thermal actuator inside said valve plug.

8. The method according to claim 7 wherein providing an apparatus further comprises disposing said temperature sensor in the housing inlet.

9. The method according to claim 8 wherein providing an apparatus further comprises a bleed valve disposed in the housing inlet for enabling priming of said pump.

10. The method according to claim 8 wherein providing an apparatus further comprises a support spring disposed inside said bore for positioning said valve plug within said bore.

* * * * *